United States Patent [19]

Hüber et al.

[11] 4,135,771

[45] Jan. 23, 1979

[54] SPHERICAL END BEARING HAVING TWO OR MORE ZONES OF HYDRODYNAMICALLY ACTING GROOVES

[75] Inventors: Wolfgang Hüber; Ludwig Feuerer, both of Schweinfurt, Fed. Rep. of Germany

[73] Assignee: SKF Kugellagerfabriken GmbH, Schweinfurt, Fed. Rep. of Germany

[21] Appl. No.: 825,173

[22] Filed: Aug. 16, 1977

[30] Foreign Application Priority Data

Aug. 18, 1976 [DE] Fed. Rep. of Germany ....... 7625840

[51] Int. Cl.² .................................................. F16C 17/16
[52] U.S. Cl. ...................................... 308/9; 308/134.1; 308/140; 308/172
[58] Field of Search ............... 308/172, 171, 170, 168, 308/169, 163–166, 122, 121, 35, 134.1, 72, DIG. 1, 106, 107, 9, 139, 159, 140, 160, 240, 5 R

[56] References Cited

U.S. PATENT DOCUMENTS

| | | | |
|---|---|---|---|
| 3,399,000 | 8/1968 | Remmers | 308/172 X |
| 3,799,629 | 3/1974 | Laing | 308/134.1 |
| 4,007,974 | 2/1977 | Huber | 308/170 X |

*Primary Examiner*—Duane A. Reger
*Assistant Examiner*—Douglas C. Butler
*Attorney, Agent, or Firm*—Daniel M. Rosen

[57] ABSTRACT

In a shaft end bearing, the shaft end has a convex curved friction or sliding surface of revolution, and cooperates with a correspondingly curved concave friction or sliding surface. At least one of these surfaces has grooves inclined to the circumferential direction for effecting the dynamic build-up of fluid lubricant. The grooves are separated into two different annular zones spaced apart by a zone having no grooves and serving as a throttle.

6 Claims, 1 Drawing Figure

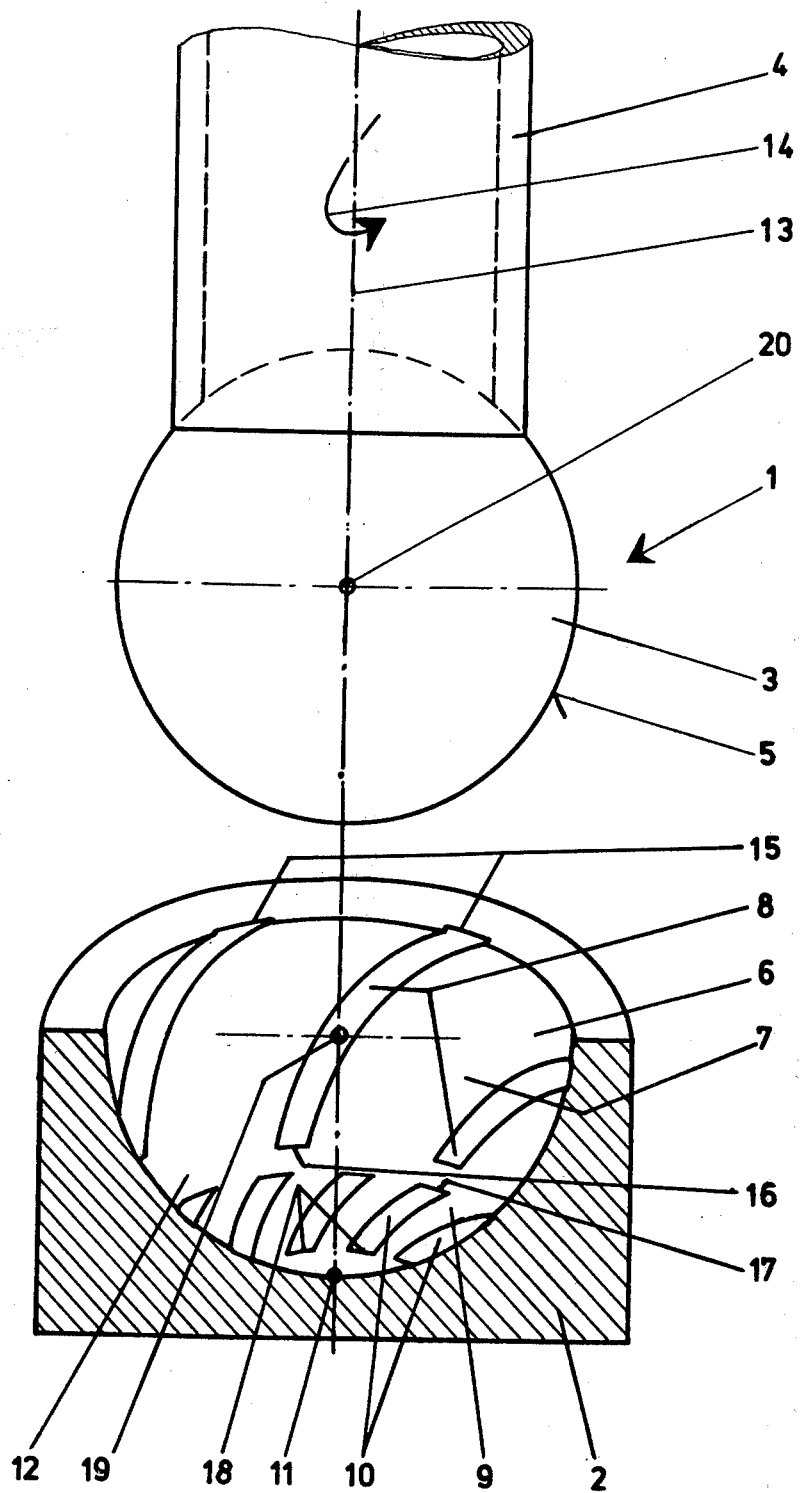

SPHERICAL END BEARING HAVING TWO OR MORE ZONES OF HYDRODYNAMICALLY ACTING GROOVES

This invention relates to a shaft end bearing having a convex curved friction surface which cooperates with a corresponding concave curved bearing surface. The invention is more particularly directed to a bearing of the type in which pressure building grooves are formed in one or both of the surfaces to extend in a direction inclined to the circumferential direction. In these arrangements, the grooves promote the formation of dynamic fluid flow from the equatorial regions in the direction of the poles of the sliding friction surfaces. The fluid may be a fluid in which the bearing is immersed, and may be air, or lubricating oil or other lubricating liquid.

A shaft end bearing of this type is known, in which one or both of the friction surfaces is provided with an annular zone of inclined or spiral grooves, which begin in the corresponding equatorial region of the surface, and end in the vicinity of the poles. These known shaft end bearings have the disadvantage that they have relatively small radial loading capacity.

In order to overcome this disadvantage, in another form of shaft end bearing, the bearing has a first annular zone in the equatorial region which pumps the fluid lubricant to the pole of the friction surface in an inclined or spiral direction, as well as a second annular region in the vicinity of the pole zone, which pumps the fluid from the pole to the equatorial region. As a consequence, in this bearing a current of the fluid flows between the two annular zones. While these known end bearings have an improved radial loading capacity, they possess a relatively small axial loading capacity.

The present invention is therefore directed to the provision of an improved shaft end bearing of the above type, which has a good carrying capacity in the axial as well as in the radial direction.

According to the invention, this object is achieved by providing a bearing in which at least one annular zone of grooves is provided in the pole region as well as in the vicinity of the equator. In this arrangement, the grooves in the vicinity of the equator of the bearing receive the fluid, for example, from the environment of the bearing, and dynamically direct it, due to the relative rotation of the bearing members, from the equatorial regions of the bearing toward the pole. The grooves are closed, resulting in the pressure of the fluid dynamically building up, so that at the circumference of the bearing a pressure build-up occurs, and results in the formation of a dynamic lubricating film. This increases the carrying capacity of the shaft end bearing in the radial direction. A portion of the fluid receives the radially outer ends of the grooves in the zone of grooves adjacent the pole region, and this fluid is pumped by the relative rotation of the bearing members toward the pole. As a consequence, a pressure build-up occurs at the pole, which acts essentially in the axial direction. As a consequence, the axial carrying capacity of the shaft end bearing is also increased.

According to a further feature of the invention, the annular zone of grooves of the equatorial region and the annular zone of grooves in the region of the poles are separated from one another by an annular grooveless throat zone.

In order to provide the optimum dynamic fluid flow conditions in the shaft end bearing in accordance with a further feature of the invention, the inclination and the count of the rows of the annular zone of the equatorial region and the inclination and count of the grooves of the annular zone in the region of the pole line zones can be of different magnitudes.

Preferably, in accordance with another feature of the invention, the annular zone of the equatorial region extends from about 50° to at the most 90°, and the annular zone in the region of the poles extends from about 10° to about 40°, measured from the center of curvature of the curved sliding surfaces relative to the shaft axis 19.

In order that the invention will be more clearly understood, it will now be disclosed in greater detail with reference to the accompanying drawing, wherein:

The sole FIGURE of the drawing is an exposed partially cross-sectional view of a sliding bearing in accordance with one embodiment of the invention.

Referring now to the drawing, therein is illustrated a shaft end bearing in accordance with the invention, in which the shaft end 1 is shown separated from the accompanying spherical shell 2, in order to more clearly illustrate the invention. The shell 2 is shown in cross-section. The shaft end consists of a ball 3, which can be manufactured from rolling bearing steel, and is fastened on the end of the hollow shaft 4, for example, by welding or brazing.

In the equatorial region of the friction or sliding surface 6 of the spherical sheel 2, a zone is provided having spiral grooves 8 inclined to the circumferential direction of the surface. In the vicinity of the pole 11 a zone 9 is provided with grooves 10. These latter grooves are formed to extend inclined to the circumferential direction in the same rotational sense as the grooves 8. An annular grooveless throttle or throat zone 12 separates the zone 7 of the equatorial region from the zone 9 adjacent the pole 11.

In operation, the shaft 4 turns about its axis 13 in the direction of the arrow 14, so that the spherical convex curved friction surface 5 of the shaft end 1 slides on the corresponding ball-shaped concave formed sliding surface 6 of the spherical shell 2. The shell 2 may be fixed in a suitable (not shown) support. The environment of the shaft end bearing is filled with a fluid lubricant medium, for example, oil, grease, or air, so that this relative turning of the grooves 8,10, results in hydrodynamic or aerodynamic action, and the lubricant medium is pumped from the equatorial region of the surfaces 5,6, in the direction of the pole 11. The lubricant medium is pumped from the entrances 15 of the grooves, which communicate with the environment of the shaft end bearings, to the outlets 16 of the grooves 8, which are limited by the throat zone 12. In this throat or throttle zone a dynamic pressure build-up occurs, which acts on the bearing circumference and carries the shaft end bearing in an essentially radial direction. The lubricant medium which is dammed up at the outward ends 16 of the grooves 8, at the lubricant space between the throat zone 12 of the sliding surfaces 5 and 6, eventually reaches the input ends of the grooves 10 in the pole region, and is further pumped in these grooves 10 in the region of the pole 11. This results in a further dynamic pressure build-up of the lubricant medium in the grooves 10 at the output ends 18 of these latter grooves. This pressure build-up is effected at the pole 11, and the pressure opposes axial forces directed on the bearing.

In accordance with the invention, the annular zone 7 of grooves in the equatorial region extends generally from the equator of the bearing toward the pole a sufficient distance to enable the desired pressure build-up, the grooves 8 in this region being open or otherwise adapted to receive fluid at the inlet end, and closed at the output ends. The grooves 10 of the zone 9, however, have both of their ends closed, so that they do not receive the fluid lubricating medium directly from the environment. It is further evident that these latter grooves must terminate sufficiently close to the pole 11 that the desired pressure build-up occurs to absorb axial forces. It is further apparent that the pressure build-up in the two sets of grooves is effected for different functions, and hence the two sets of grooves may be designed differently in order to serve their different functions. For this purpose, for example, the inclinations of the grooves in the two zones may be different, and the number of grooves in the two zones may also be different.

In the above description, the term "input" end of the grooves refers generally to the radially outer ends of the grooves, and the term "output" ends of the grooves refers generally to the radially inwardly ends of the respective grooves. It is, of course, apparent that the annular zones of grooves may overlap, but the annular grooves have different angular widths.

In accordance with the invention a shaft end bearing having an especially high radial carrying capacity and a corresponding unusually large size axial bearing capacity, has a zone 7 of the equatorial region extending from 50° up to a maximum of 90°, and the zone 9 extending from about 10° to 40°. These angular degrees are measured from the center of curvature 19,20 to the ball-shaped curved sliding surface 5,6 relative to the shaft axis 13.

The shaft end bearing in accordance with the invention therefore has the advantage that it provides a simple spherical bearing that is economically produceable, has an unusually large dynamic carrying capacity in the radial and axial directions, and has automatic angular adjustability (for small displacements of the shaft).

While the invention has been disclosed and described with reference to a single embodiment, it will be apparent that variations and modifications may be made therein. Thus, the inclinations and number of grooves in the different zones may be different than that illustrated in the drawing, in order to obtain optimum load capacity for the bearing under any existing condition. Further, it is apparent that the shaft 4 need not be hollow as illustrated, and that the concave portion of the bearing structure may be provided on the end of the shaft rather than the convex portion as illustrated, to form a bearing with a correspondingly curved convex portion on the shell. It is therefore intended in the following claims to cover each such variation and modification as falls within the true spirit and scope of the invention.

What is claimed is:

1. In a sliding bearing comprising a first member having a convex curved first sliding surface of revolution, and a second member having a correspondingly concave curved sliding surface of revolution into which said first surface is slidably fit for relative rotation, each of said surfaces having an equator and a pole, and at least one of said surfaces have a first set of grooves therein extending in a direction inclined to the circumferential direction for producing a dynamic fluid current flow in said sliding bearing in the direction from the equator toward the pole upon relative rotation of said first and second members in one rotational sense; the improvement wherein said first set of grooves extends in a first annular zone from the equator towards the pole and have closed ends toward said pole, and further comprising a second set of grooves inclined in the same rotational sense as said first set and extending in a second annular zone from the vicinity of said pole, the grooves of said first and second annular zones being separated from one another.

2. The sliding bearing of claim 1, wherein said first member comprises a shaft.

3. The sliding bearing of claim 1, further comprising an annular throttle zone between and separating said first and second annular zones, said throttle zone being grooveless.

4. The sliding bearing of claim 1, wherein the inclinations of the grooves in said first zone, with respect to the circumferential direction of the respective surface, are different than the inclination of the grooves in said second zone.

5. The sliding bearing of claim 1, wherein said first zone has a different number of said inclined grooves than said second zone.

6. The sliding bearing of claim 1, wherein said first zone extends through an angle of from 50° to 90° and said second zone extends through an angle of from 10° to 40°, said angles being measured from an apex at the center of curvature of said one surface with respect to the axis of revolution of said sliding bearing.

* * * * *